(12) United States Patent
Um et al.

(10) Patent No.: US 12,731,584 B2
(45) Date of Patent: Sep. 8, 2026

(54) ELECTRONIC DEVICE AND USER UTTERANCE PROCESSING METHOD

(71) Applicant: SAMSUNG ELECTRONICS CO., LTD., Suwon-si (KR)

(72) Inventors: Taekwang Um, Suwon-si (KR); Namhoon Kim, Suwon-si (KR); Kyounghoon Lee, Suwon-si (KR); Youngki Lee, Suwon-si (KR); Heeyoung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 18/587,141

(22) Filed: Feb. 26, 2024

(65) Prior Publication Data

US 2024/0212682 A1 Jun. 27, 2024

Related U.S. Application Data

(63) Continuation of application No. PCT/KR2023/013897, filed on Sep. 15, 2023.

(30) Foreign Application Priority Data

Sep. 16, 2022 (KR) ........................ 10-2022-0117121
Oct. 11, 2022 (KR) ........................ 10-2022-0129431

(51) Int. Cl.
*G10L 15/22* (2006.01)
*G10L 15/19* (2013.01)

(52) U.S. Cl.
CPC .............. *G10L 15/22* (2013.01); *G10L 15/19* (2013.01)

(58) Field of Classification Search
USPC ......................... 704/246, 247, 251, 252, 275
See application file for complete search history.

(56) References Cited

U.S. PATENT DOCUMENTS 9,607,617 B2 * 3/2017 Hebert .................... G10L 15/22
10,482,885 B1 * 11/2019 Moniz ..................... G06F 3/167
(Continued)

FOREIGN PATENT DOCUMENTS

KR 10-2016-0147303 A 12/2016
KR 10-2018-0070684 A 6/2018
(Continued)

OTHER PUBLICATIONS

Communication dated Jun. 12, 2025, issued by European Patent Office in European Patent Application No. 23865893.4.
(Continued)

*Primary Examiner* — Leonard Saint-Cyr
(74) *Attorney, Agent, or Firm* — Sughrue Mion, PLLC

(57) ABSTRACT

An electronic device includes: memory storing instructions; and at least one processor. Wherein the instructions which when executed by at least one processor, cause at least one processors to perform control to: receive a first signal corresponding to a first utterance of a user; provide a first response corresponding to the first utterance; obtain cross-domain data based on the first utterance or the first response; receive a second signal corresponding to a second utterance following the first utterance; and provide a second response corresponding to the second utterance based on the cross-domain data when the second utterance includes anaphora. The first utterance and the second utterance respectively correspond to different domains.

15 Claims, 9 Drawing Sheets

(56) References Cited

U.S. PATENT DOCUMENTS

| | | | | |
|---|---|---|---|---|
| 11,783,824 | B1 * | 10/2023 | Mars | G06F 3/167 704/270 |
| 2019/0095171 | A1 | 3/2019 | Carson et al. | |
| 2021/0109706 | A1 | 4/2021 | Jayakumar et al. | |
| 2022/0138427 | A1 | 5/2022 | Lee et al. | |
| 2022/0415326 | A1 * | 12/2022 | Jacob | G10L 15/22 |

FOREIGN PATENT DOCUMENTS

| | | | |
|---|---|---|---|
| KR | 10-2019-0126734 | A | 11/2019 |
| KR | 10-2021-0001082 | A | 1/2021 |
| KR | 10-2021-0036527 | A | 4/2021 |
| KR | 10-2021-0039049 | A | 4/2021 |
| KR | 10-2022-0045741 | A | 4/2022 |
| KR | 10-2022-0058745 | A | 5/2022 |

OTHER PUBLICATIONS

International Search Report (PCT/ISA/210) issued by the International Searching Authority on Dec. 26, 2023 in corresponding International Application No. PCT/KR2023/013897.

* cited by examiner

ELECTRONIC DEVICE AND USER UTTERANCE PROCESSING METHOD

CROSS-REFERENCE TO RELATED APPLICATIONS

This application is a continuation application of International Application No. PCT/KR2023/013897 designating the United States, filed on Sep. 15, 2023, in the Korean Intellectual Property Receiving Office and claiming priority to Korean Patent Application No. 10-2022-0117121, filed on Sep. 16, 2022, and Korean Patent Application No. 10-2022-0129431, filed on Oct. 11, 2022, in the Korean Intellectual Property Office, the disclosures of which are incorporated by reference herein in their entireties.

FIELD

The disclosed embodiments relate to an electronic device and a user utterance processing method.

BACKGROUND

Electronic devices including a voice assistant function providing a service based on a user utterance have been widely distributed. The electronic devices may recognize the user utterance through an artificial intelligence (AI) server and may figure out the meaning and intent of the user utterance. The AI server may infer the intent of a user by interpreting an utterance of the user and perform tasks according to the inferred intent. The AI server may perform a task according to the intent of the user expressed through natural language interactions between the user and the AI server.

An operation of the AI server classifying the intent of the user to perform the task may be performed by using a neural network-based model. A neural network-based classification model may require many training utterances.

SUMMARY

An electronic device includes: memory storing instructions; and at least one processor. Wherein the instructions which when executed by at least one processor, cause at least one processors to perform control to: receive a first signal corresponding to a first utterance of a user; provide a first response corresponding to the first utterance; obtain cross-domain data based on the first utterance or the first response; receive a second signal corresponding to a second utterance following the first utterance; and provide a second response corresponding to the second utterance based on the cross-domain data when the second utterance includes anaphora. The first utterance and the second utterance respectively correspond to different domains.

A method of operating an electronic device may include: receiving a first signal corresponding to a first utterance; providing a first response corresponding to the first utterance; obtaining cross-domain data based on the first utterance or the first response; receiving a second signal corresponding to a second utterance of the user following the first utterance; and providing a second response corresponding to the second utterance based on the cross-domain data when the second utterance includes anaphora. The first utterance and the second utterance may respectively correspond to different domains.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
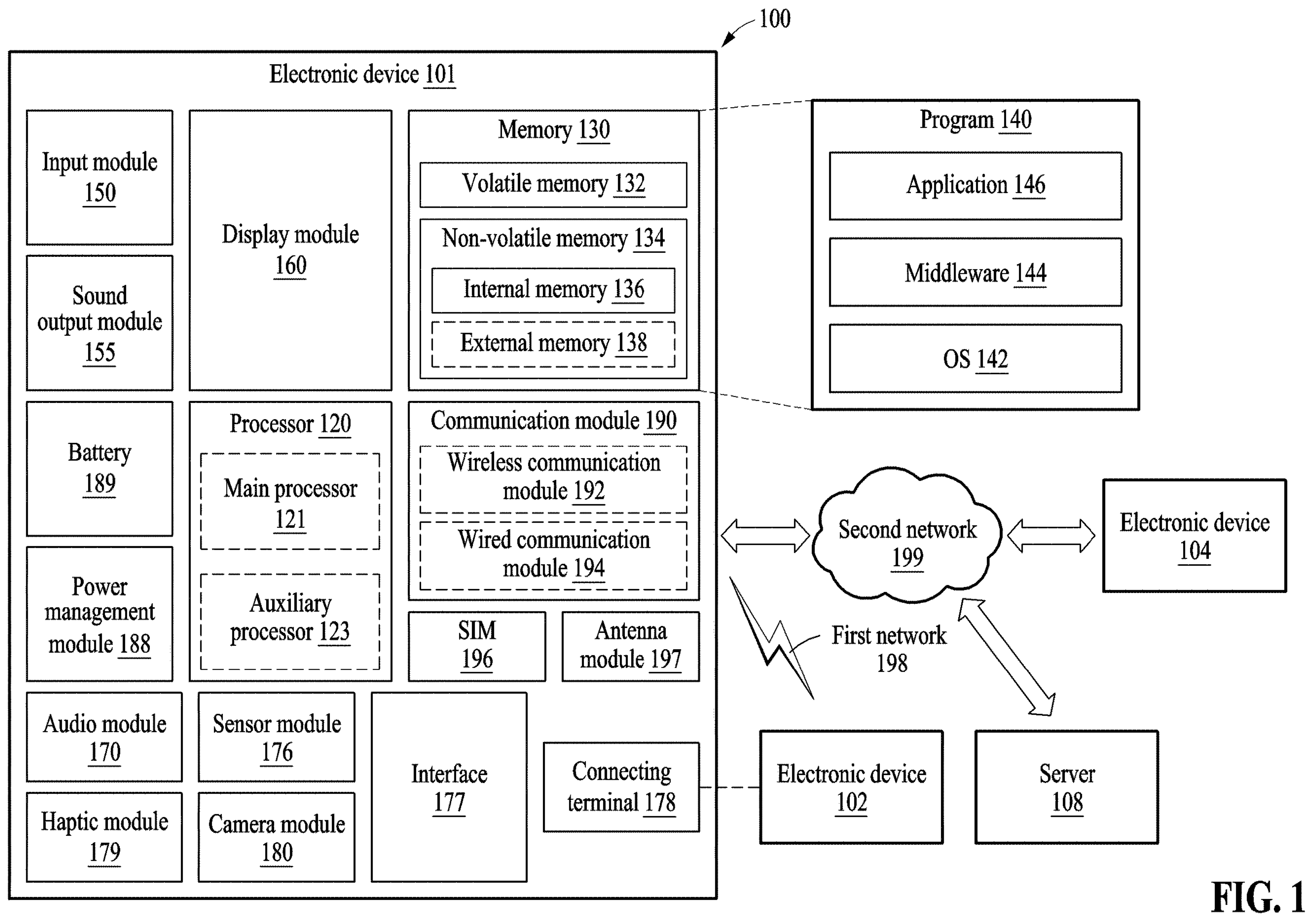
FIG. 1 is a block diagram illustrating an electronic device in a network environment according to an embodiment.

Hereinafter, embodiments are described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

According to an embodiment, the processor 120 may execute, for example, software (e.g., a program 140) to control at least one other component (e.g., a hardware or software component) of the electronic device 101 connected to the processor 120 and may perform various data processing or computation. As at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

According to an embodiment, the auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specifically for artificial intelligence model processing. An artificial intelligence (AI) model may be generated by machine learning. Such learning may be performed by, for example, the electronic device 901 in which artificial intelligence is performed, or performed via a separate server (e.g., the server 908). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

According to an embodiment, the memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

According to an embodiment, the program 140 may be stored as software in the memory 130, and may include, for example, an operating system (OS) 142, middleware 144, or an application 146.

According to an embodiment, the input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

According to an embodiment, the sound output module 750 may output a sound signal to the outside of the electronic device 210. The sound output module 155 may include, for example, a speaker or a receiver. The speaker may be used for general purposes, such as playing multimedia or playing a record. The receiver may be used to receive an incoming call. The receiver may be implemented separately from the speaker or as a part of the speaker.

According to an embodiment, the display module 160 may visually provide information to the outside (e.g., a user) of the electronic device 101. The display module 160 may include, for example, a display, a hologram device, or a projector and control circuitry to control a corresponding one of the display, the hologram device, and the projector. The display module 160 may include a touch sensor adapted to detect a touch, or a pressure sensor adapted to measure the intensity of force incurred by the touch.

According to an embodiment, the audio module 170 may convert a sound into an electrical signal or vice versa. The audio module 170 may obtain the sound via the input module 150 or output the sound via the sound output module 155 or an external electronic device (e.g., the electronic device 102 such as a speaker or a headphone) directly or wirelessly connected to the electronic device 101.

According to an embodiment, the sensor module 176 may detect an operational state (e.g., power or temperature) of the electronic device 101 or an environmental state (e.g., a state of a user) external to the electronic device 101 and generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, the interface 177 may support one or more specified protocols to be used by the electronic device 101 to couple with the external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

According to an embodiment, the connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

According to an embodiment, the haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

According to an embodiment, the camera module 180 may capture a still image and moving images. The camera module 180 may include one or more lenses, image sensors, image signal processors, or flashes.

According to an embodiment, the power management module 188 may manage power supplied to the electronic device 101. The power management module 188 may be implemented as, for example, at least a part of a power management integrated circuit (PMIC).

According to an embodiment, the battery 189 may supply power to at least one component of the electronic device 101. The battery 189 may include, for example, a primary cell, which is not rechargeable, a secondary cell, which is rechargeable, or a fuel cell.

According to an embodiment, the communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

According to an embodiment, the wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beam-forming, massive multiple-input and multiple-output (MIMO), full dimensional MIMO (FD-MIMO), an array antenna, analog beam-forming, or a large-scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

According to an embodiment, the antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to an embodiment, the antenna module 197 may form a mmWave antenna module. According to one embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

According to an embodiment, at least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, a cloud computing, distributed computing, mobile edge computing (MEC), or client-server computing technology may be used, for example. The electronic device 101 may provide ultra-low-latency services using, e.g., distributed computing or MEC. In an embodiment, the external electronic device (e.g., the electronic device 104) may include an Internet-ofthings (IOT) device. The server 108 may be an intelligent server using machine learning and/or a neural network. According to one embodiment, the external electronic device (e.g., the electronic device 104) or the server 108 may be included in the second network 199. The electronic device 101 may be applied to intelligent services (e.g., smart home, smart city, smart car, or healthcare) based on 5G communication technology or IoT-related technology.

Figure 2:
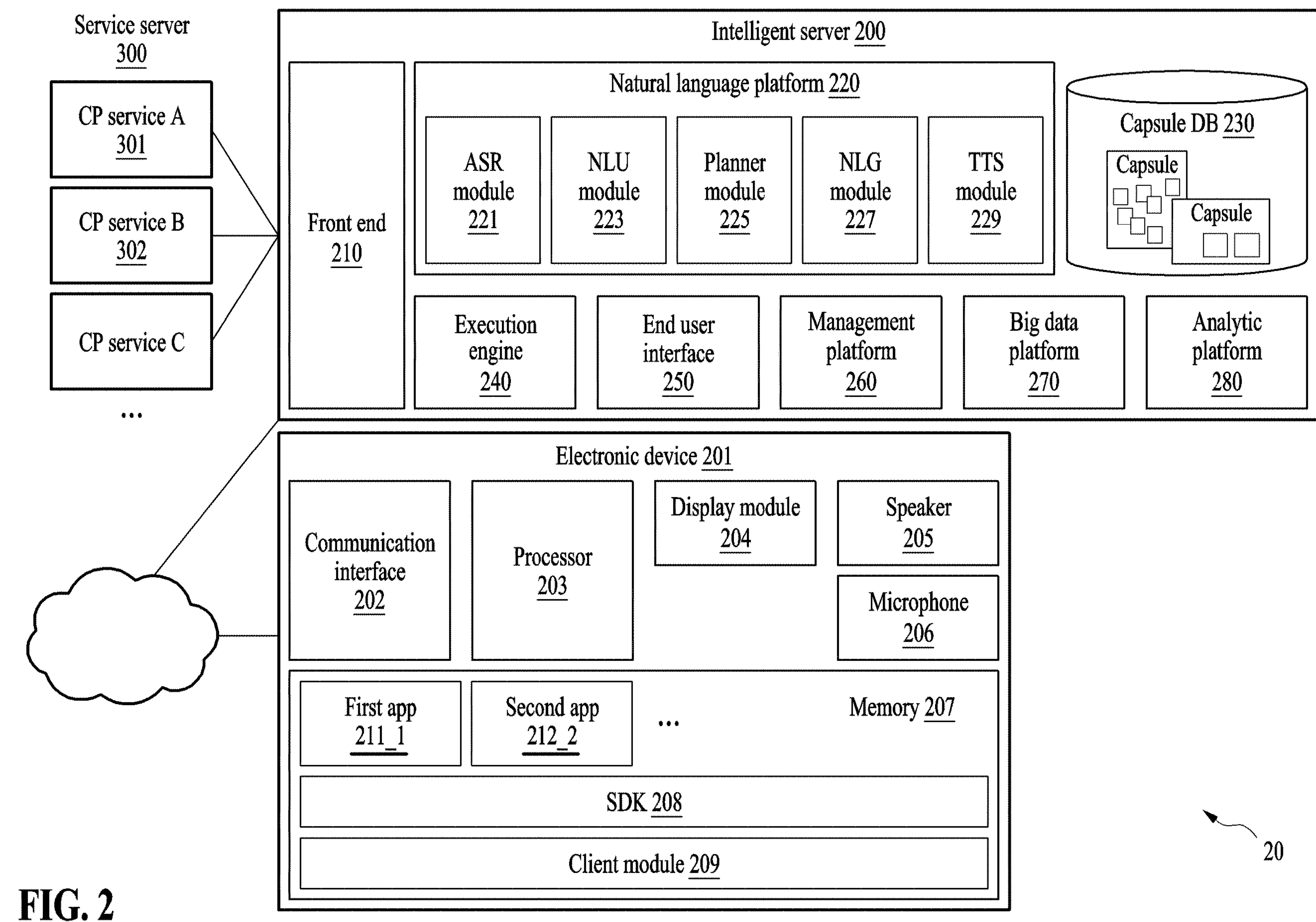
FIG. 2 is a block diagram illustrating an integrated intelligence system according to an embodiment.

FIG. 2 is a block diagram illustrating an integrated intelligence system according to an embodiment.

Referring to FIG. 2, an integrated intelligence system 20 may include an electronic device 201 (e.g., the electronic device 101 of FIG. 1), an intelligent server 200 (e.g., the server 108 of FIG. 1), and a service server 300 (e.g., the server 108 of FIG. 1).

According to an embodiment, the electronic device 101 may be a terminal device (or an electronic device) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown embodiment, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), memory 207 (e.g., the memory 130 of FIG. 1), or a processor 203 (e.g., the processor 120 of FIG. 1). The components listed above may be operationally or electrically connected to each other.

According to an embodiment, the communication interface 202 may be connected to an external device and configured to transmit and receive data to and from the external device. The microphone 206 may receive a sound (e.g., a user utterance) and convert the sound into an electrical signal. The speaker 205 may output the electrical signal as a sound (e.g., a speech).

According to an embodiment, the display module 204 may be configured to display an image or video. The display module 204 may also display a graphical user interface (GUI) of an app (or an application program) being executed. The display module 204 may receive a touch input through a touch sensor. For example, the display module 204 may receive a text input through a touch sensor in an on-screen keyboard area displayed in the display module 204.

According to an embodiment, the memory 207 may store a client module 209, a software development kit (SDK) 208, and a plurality of apps 211. The client module 209 and the SDK 208 may configure a framework (or a solution program) for performing general-purpose functions. In addition, the client module 209 or the SDK 208 may configure a framework for processing a user input (e.g., a voice input, a text input, or a touch input).

According to an embodiment, the plurality of apps 211 stored in the memory 207 may be programs for performing designated functions. The plurality of apps 211 may include a first app 211-1 and a second app 211-2. Each of the plurality of apps 211 may include a plurality of actions for performing a designated function. For example, the apps may include an alarm app, a messaging app, and/or a scheduling app. The plurality of apps 211 may be executed by the processor 203 to sequentially execute at least a portion of the plurality of actions.

According to an embodiment, the processor 203 may control the overall operation of the electronic device 201. For example, the processor 203 may be electrically connected to the communication interface 202, the microphone 206, the speaker 205, and the display module 204 to perform a designated operation.

According to an embodiment, the processor 203 may also perform the designated function by executing the program stored in the memory 207. For example, the processor 203 may execute at least one of the client module 209 or the SDK 208 to perform the following operation for processing a user input. The processor 203 may control the operation of the plurality of apps 211 through, for example, the SDK 208. The following operation, which is the operation of the client module 209 or the SDK 208, may be performed by the processor 203.

According to an embodiment, the client module 209 may receive a user input. For example, the client module 209 may receive a voice signal corresponding to a user utterance sensed through the microphone 206. As another example, the client module 209 may receive a touch input sensed through the display module 204. As still another example, the client module 209 may receive a text input sensed through a keyboard or an on-screen keyboard. In addition, the client module 209 may receive various types of user inputs sensed through an input module included in the electronic device 201 or an input module connected to the electronic device 201. The client module 209 may transmit the received user input to the intelligent server 200. The client module 209 may transmit state information of the electronic device 201 together with the received user input to the intelligent server 200. The state information may be, for example, the execution state information of an app.

According to an embodiment, the client module 209 may receive a result corresponding to the received user input. For example, when the intelligent server 200 is capable of calculating a result corresponding to the received user input, the client module 209 may receive the result corresponding to the received user input. The client module 209 may display the received result on the display module 204. Further, the client module 209 may output the received result in an audio form through the speaker 205.

According to an embodiment, the client module 209 may receive a plan corresponding to the received user input. The client module 209 may display the results of executing a plurality of actions of an app according to the plan on the display module 204. For example, the client module 209 may sequentially display the results of executing the plurality of actions on the display module 204 and output the results in an audio form through the speaker 205. As another example, the electronic device 201 may display only a portion of the results of executing the plurality of actions (e.g., a result of the last action) on the display module 204 and output the portion of the results in an audio form through the speaker 205.

According to an embodiment, the client module 209 may receive a request for obtaining information necessary for calculating a result corresponding to the user input from the intelligent server 200. The client module 209 may transmit the necessary information to the intelligent server 200 in response to the request.

According to an embodiment, the client module 209 may transmit information on the results of executing the plurality of actions according to the plan to the intelligent server 200. The intelligent server 200 may confirm that the received user input has been correctly processed using the information on the results.

According to an embodiment, the client module 209 may include a speech recognition module. The client module 209 may recognize a voice input for performing a limited function through the speech recognition module. For example, the client module 209 may execute an intelligent app for processing a voice input to perform an organic operation through a designated input (e.g., Wake up!).

According to an embodiment, the intelligent server 200 may receive information related to a user voice input from the electronic device 201 through a communication network. The intelligent server 200 may change data related to the received voice input into text data. The intelligent server 200 may generate a plan for performing a task corresponding to the user voice input based on the text data.

According to an embodiment, the plan may be generated by an AI system. The AI system may be a rule-based system or a neural network-based system (e.g., a feedforward neural network (FNN) or a recurrent neural network (RNN)). Alternatively, the AI system may be a combination thereof or other AI systems. The plan may be selected from a set of predefined plans or may be generated in real-time in response to a user request. For example, the AI system may select at least one plan from among the predefined plans.

According to an embodiment, the intelligent server 200 may transmit a result according to the generated plan to the electronic device 201 or transmit the generated plan to the electronic device 201. The electronic device 201 may display the result according to the plan on the display module 204. The electronic device 201 may display a result of executing an action according to the plan on the display module 204.

According to an embodiment, the intelligent server 200 may include a front end 210, a natural language platform 220, a capsule database (DB) 230, an execution engine 240, an end user interface 250, a management platform 260, a big data platform 270, or an analytic platform 280.

According to an embodiment, the front end 210 may receive the received user input from the electronic device 201. The front end 210 may transmit a response corresponding to the user input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

According to an embodiment, the ASR module 221 may convert data related to the voice input received from the electronic device 201 into text data. The NLU module 223 may determine a domain (and/or intent information) corresponding to the voice input (e.g., a user utterance) by using the text data of the voice input. The domain may be a category (or a service) associated with an operation (or a function) that a user desires to execute by using a device. The domain may be classified based on a service (e.g., an app) related to text. For example, a Gracenote domain may correspond to a music search service (e.g., a Gracenote service). A Melon domain may correspond to a music play service (e.g., a Melon service). The domain may be associated with intent information corresponding to text. The NLU module 223 may discern the intent of the user by using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent. The NLU module 223 may obtain intent information corresponding to the user utterance. The intent information may be information indicating an intention of the user determined through an analysis of the text data. The intent information may include information indicating an action (or function) that the user intends to execute using a device. Slot information may be detailed information related to the intent information. The slot information may be obtained based on a domain corresponding to an utterance. The slot information may be variable information required to perform an operation. The variable information included by a slot may include a named entity. For example, when the text that is converted from a voice input of the user is "What time is it now in San Francisco?", the domain may be a 'date & time domain', the intent information may correspond to 'date/time information provision', and the slot information may be 'San Francisco'. For example, when the text that is converted from the voice input of the user is "How's the weather here?", the domain may be a 'weather domain', the intent information may correspond to 'weather information provision', and there may be no slot information.

According to an embodiment, the planner module 225 may generate a plan using a parameter and the intent determined by the NLU module 223. The planner module 225 may determine a plurality of domains required to perform a task based on the determined intent. The planner module 225 may determine a plurality of actions included in each of the plurality of domains determined based on the intent. The planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and the results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 which stores a set of relationships between concepts and actions.

According to an embodiment, the NLG module 227 may change designated information into a text form. The information changed to the text form may be in the form of a natural language utterance. The TTS module 229 may change information in the text form into information in a speech form.

According to an embodiment, some or all of the functions of the natural language platform 220 may be implemented in the electronic device 201 as well.

According to an embodiment, the capsule DB 230 may store information on the relationship between the plurality of concepts and actions corresponding to the plurality of domains. A capsule may include a plurality of action objects (or action information) and concept objects (or concept information) included in the plan. The capsule DB 230 may store a plurality of capsules in the form of a concept action network (CAN). The plurality of capsules may be stored in a function registry included in the capsule DB 230.

According to an embodiment, the capsule DB 230 may include a strategy registry that stores strategy information necessary for determining a plan corresponding to a voice input. The strategy information may include reference information for determining one plan when there are a plurality of plans corresponding to the user input. The capsule DB 230 may include a follow-up registry that stores information on follow-up actions for suggesting a follow-up action to the user in a designated situation. The follow-up action may include, for example, a follow-up utterance. The capsule DB 230 may include a layout registry that stores layout information that is information output through the electronic device 201. The capsule DB 230 may include a vocabulary registry that stores vocabulary information included in capsule information. The capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an embodiment, the capsule DB 230 may be implemented in the electronic device 201 as well.

According to an embodiment, the execution engine 240 may calculate a result using the generated plan. The end user interface 250 may transmit the calculated result to the electronic device 201. Accordingly, the electronic device 201 may receive the result and provide the received result to the user. The management platform 260 may manage information used by the intelligent server 200. The big data platform 270 may collect data of the user. The analytic platform 280 may manage a quality of service (QOS) of the intelligent server 200. For example, the analytic platform 280 may manage the components and processing rate (or efficiency) of the intelligent server 200.

According to an embodiment, the service server 300 may provide a designated service (e.g., food order or hotel reservation) to the electronic device 201. The service server 300 may be a server operated by a library administrator. The service server 300 may provide information to be used for generating a plan corresponding to the received user input to the intelligent server 200. The provided information may be stored in the capsule DB 230. In addition, the service server 300 may provide result information according to the plan to the intelligent server 200.

In the above-described integrated intelligence system 20, the electronic device 101 may provide various intelligent services to the user in response to a user input. The user input may include, for example, an input through a physical button, a touch input, or a voice input.

In an embodiment, the electronic device 201 may provide a speech recognition service through an intelligent app (or a speech recognition app) stored therein. In this case, for example, the electronic device 201 may recognize a user utterance or a voice input received through the microphone and provide a service corresponding to the recognized voice input to the user.

In an embodiment, the electronic device 201 may perform a designated action alone or together with the intelligent server and/or a service server, based on the received voice input. For example, the electronic device 201 may execute an app corresponding to the received voice input and perform a designated action through the executed app.

In an embodiment, when the electronic device 201 provides a service together with the intelligent server 200 and/or the service server 300, the electronic device 201 may detect a user utterance using the microphone 206 and generate a signal (or voice data) corresponding to the detected user utterance. The electronic device 201 may transmit the voice data to the intelligent server 200 using the communication interface 202.

According to an embodiment, the intelligent server 200 may generate, as a response to the voice input received from the electronic device 201, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or the result values output by the execution of the plurality of actions. The plan may include connection information between the plurality of actions and the plurality of concepts.

According to an embodiment, the electronic device 201 may receive the response using the communication interface 202. The electronic device 201 may output a voice signal internally generated by the electronic device 201 to the outside using the speaker 205, or output an image internally generated by the electronic device 201 to the outside using the display module 204.

Figure 3:
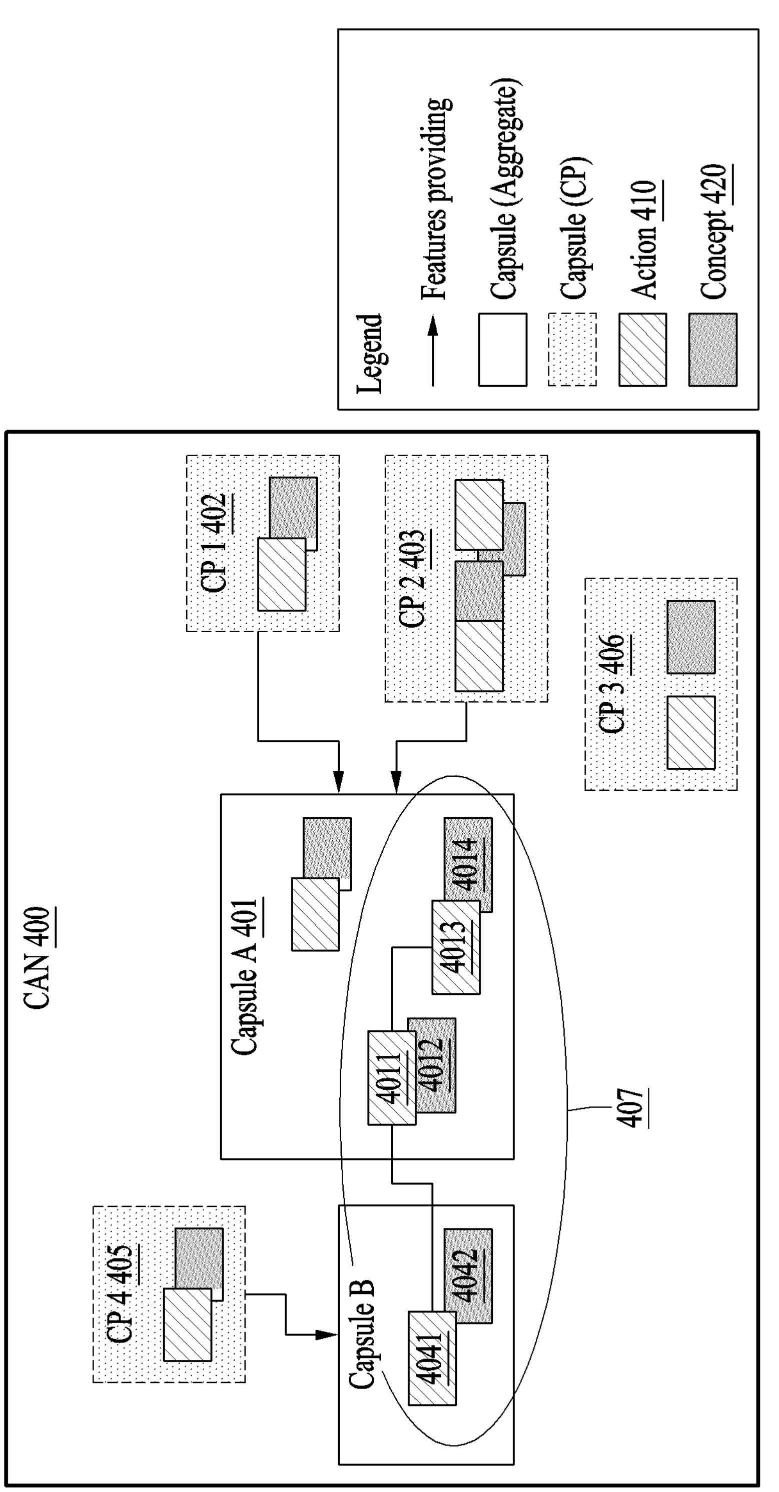
FIG. 3 is a diagram illustrating a form in which relationship information between concepts and actions is stored in a database, according to an embodiment.

FIG. 3 is a diagram illustrating a form in which relationship information between concepts and actions is stored in a database, according to an embodiment.

According to an embodiment, a capsule DB (e.g., the capsule DB 230 of FIG. 2) of the intelligent server (e.g., the intelligent server 200 of FIG. 2) may store capsules in the form of a CAN 400. The capsule DB may store an action for processing a task corresponding to a voice input of a user and a parameter necessary for the action in the form of a CAN.

According to an embodiment, the capsule DB may store a plurality of capsules (a capsule A 401 and a capsule B 404) respectively corresponding to a plurality of domains (e.g., applications). One capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. One capsule may include at least one action 410 for performing a designated function and at least one concept 420.

According to an embodiment, a natural language platform (e.g., the natural language platform 220 of FIG. 2) may generate a plan for performing a task corresponding to the received speech input using the capsules stored in the capsule DB. For example, a planner module (e.g., the planner module 225 of FIG. 2) of the natural language platform may generate the plan using the capsules stored in the capsule DB. For example, a plan 407 may be generated using actions 4011 and 4013 and concepts 4012 and 4014 of the capsule A 401, and an action 4041 and a concept 4042 of the capsule B 404.

Figure 4:
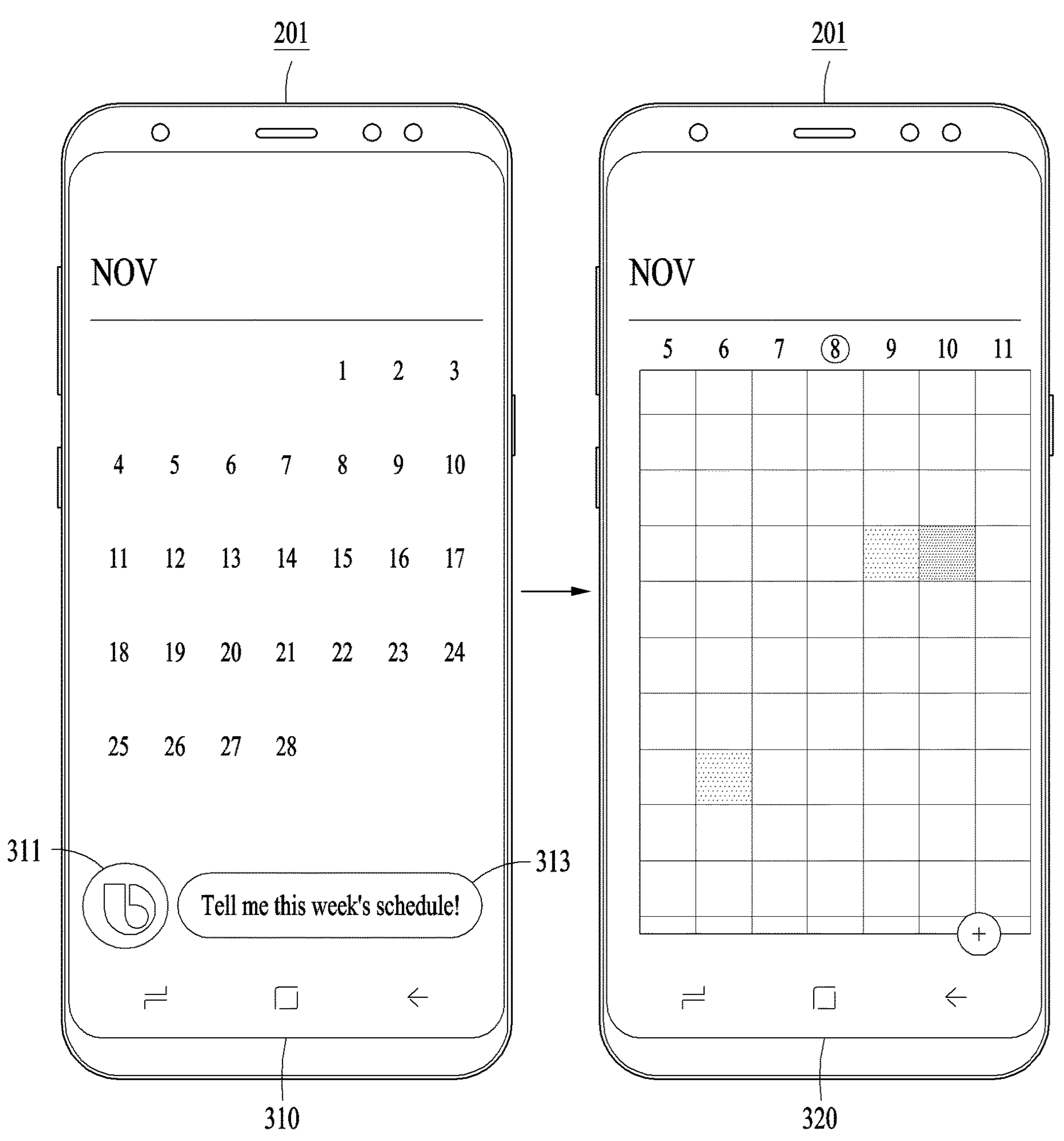
FIG. 4 is a diagram illustrating a screen of an electronic device processing a received voice input through an intelligent app, according to an embodiment.

FIG. 4 is a diagram illustrating a screen of an electronic device processing a received voice input through an intelligent app, according to an embodiment.

According to an embodiment, an electronic device 201 may execute an intelligent app to process a user input through an intelligent server (e.g., the intelligent server 200 of FIG. 2).

According to an embodiment, on a screen 310, when a designated voice input (e.g., Wake up!) is recognized or an input through a hardware key (e.g., a dedicated hardware key) is received, the electronic device 201 may execute an intelligent app for processing the voice input. The electronic device 201 may execute the intelligent app, for example, in a state in which a scheduling app is executed. The electronic device 201 may display an object (e.g., an icon) 311 corresponding to the intelligent app on the display module 204 (e.g., the display module 160 of FIG. 1 and the display module 204 of FIG. 2). The electronic device 201 may receive a voice input by a user utterance. For example, the electronic device 201 may receive a voice input of "Tell me this week's schedule!". The electronic device 201 may display a user interface (UI) 313 (e.g., an input window) of the intelligent app in which text data of the received voice input is displayed on the display module 204.

According to an embodiment, on a screen 320, the electronic device 201 may display a result corresponding to the received voice input on the display module 204. For example, the electronic device 201 may receive a plan corresponding to the received user input, and display "this week's schedule" on the display module 204 according to the plan.

Figure 5:
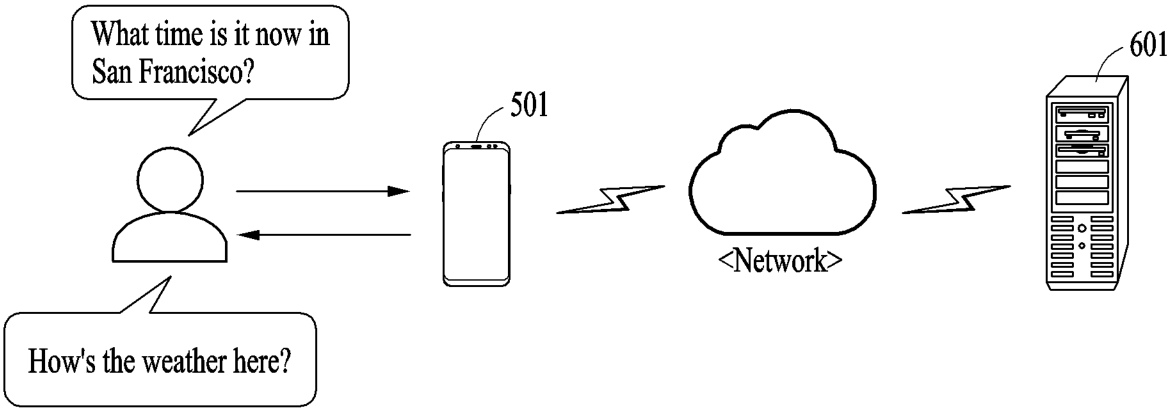
FIG. 5 is a diagram illustrating an operation of an electronic device to process a user utterance, according to an embodiment.

FIG. 5 is a diagram illustrating an operation of an electronic device to process a user utterance, according to an embodiment.

Referring to FIG. 5, in an embodiment, an electronic device 501 may include at least some components of the electronic device 101 described with reference to FIG. 1 and the electronic device 201 described with reference to FIG. 2. An intelligent server 601 may include at least some components of the intelligent server 200 described with reference to FIG. 2. With respect to the electronic device 501 and the intelligent server 601, repeated descriptions provided with reference to FIGS. 1 to 4 are omitted.

According to an embodiment, the electronic device 501 (e.g., the electronic device 101 of FIG. 1 or the electronic device 201 of FIG. 2) may be connected to the intelligent server 601 (e.g., the intelligent server 200 of FIG. 2) via a LAN, a WAN, a value-added network (VAN), a mobile radio communication network, a satellite communication network, or any combination thereof. The electronic device 501 and the intelligent server 601 may communicate with each other through a wired communication method or a wireless communication method (e.g., a wireless LAN (Wi-Fi), Bluetooth, Bluetooth low energy, ZigBee, Wi-Fi direct (WFD), ultra-wideband (UWB), infrared data association (IrDA), and near field communication (NFC)).

In an embodiment, the electronic device 501 may be implemented as at least one of smartphones, tablet personal computers (PCs), mobile phones, speakers (e.g., artificial intelligence (AI) speakers), video phones, e-book readers, desktop PCs, laptop PCs, netbook computers, workstations, servers, personal digital assistants (PDAs), portable multimedia players (PMPs), MP3 players, mobile medical devices, cameras, or wearable devices.

In an embodiment, the electronic device 501 may obtain a voice signal corresponding to an utterance of a user and may transmit the voice signal to the intelligent server 601. The intelligent server 601 may obtain text data corresponding to the utterance of the user based on the voice signal. The text data may be obtained by converting a voice part into computer-readable text by performing ASR on the voice signal. The intelligent server 601 may analyze the utterance of the user using the text data. The intelligent server 601 may perform a required function using an analysis result (e.g., intent information, an entity, and/or a capsule) or may provide a response (e.g., a question and an answer) to be provided to a user to a device (e.g., the electronic device 501). The intelligent server 601 may be implemented as software. Some or all of the intelligent server 601 may be implemented in the electronic device 501 and/or the intelligent server 601 (e.g., the intelligent server 200 of FIG. 2). On-device AI for processing an utterance without communication with the intelligent server 601 may be installed on the electronic device 501. Components, such as the natural language platform 220 described with reference to FIGS. 2 to 4, may be implemented in the electronic device 501.

According to an embodiment, the ASR module 221 (e.g., the ASR module of FIG. 2) included in the natural language platform 220 may convert a user utterance into text data. The NLU module 223 included in the natural language platform 220 may determine a domain (and/or intent information) corresponding to the user utterance by using the text data corresponding to the user utterance. The domain may be a category (or a service) associated with an operation (or a function) that a user desires to execute by using a device. The domain may be classified based on a service (e.g., an app) related to a user utterance. For example, the Gracenote domain may correspond to a music search service (e.g., the Gracenote service). For example, the Melon domain may correspond to a music play service (e.g., the Melon service). A plurality of user utterances may be respectively processed based on respective domains corresponding thereto.

According to an embodiment, the electronic device 501 may support a cross-domain scenario. The cross-domain scenario may mean that a plurality of utterances (e.g., consecutive utterances) may respectively corresponds to different domains. When the utterances (e.g., the consecutive utterances) are processed in a single domain, information (e.g., information corresponding to anaphora) included in a previous utterance (e.g., an utterance before a subsequent utterance) may be used to process the subsequent utterance (e.g., a later utterance among the consecutive utterances) including the anaphora (or insufficiently including information needed for utterance processing). When consecutive utterances are respectively processed in different domains (e.g., the cross-domain scenario), the information included in the previous utterance may not be readily available for processing the subsequent utterance including the anaphora (or insufficiently including the information needed for utterance processing). Information exchange may not be readily available between different domains in the cross-domain scenario according to an information security policy. In the cross-domain scenario, the electronic device 501 may use the information (e.g., cross-domain data) included in the previous utterance. The electronic device 501 may support the cross-domain scenario by using the cross-domain data obtained from a user utterance.

Referring to FIG. 5, the electronic device 501 may receive an utterance (e.g., "What time is it now in San Francisco?"). The electronic device 501 may receive a subsequent utterance (e.g., "How's the weather here?") following the utterance (e.g., "What time is it now in San Francisco?"). The utterance (e.g., "What time is it now in San Francisco?") may correspond to a date & time domain associated with a service providing a date and time. The subsequent utterance (e.g., "How's the weather here?") may correspond to a weather domain associated with a service providing the weather. Since the continuous utterances respectively correspond to the different domains, the situation illustrated in FIG. 5 may be the cross-domain scenario. The subsequent utterance (e.g., "How's the weather here?") may include anaphora (e.g., here). In the cross-domain scenario, the electronic device 501 may use the information (e.g., the cross-domain data) (e.g., San Francisco) included in the utterance (e.g., "What time is it now in San Francisco?") to process the subsequent utterance (e.g., "How's the weather here?") including the anaphora (e.g., here) (or insufficiently including the information needed for utterance processing). The electronic device 501 may provide a response (e.g., "San Francisco is sunny.") corresponding to the subsequent utterance (e.g., "How's the weather here?") based on the cross-domain data (e.g., place—San Francisco). The electronic device 501 may support the cross-domain scenario based on the cross-domain data obtained from the user utterance.

According to an embodiment, some or all operations performed by the electronic device 501 may be performed by the electronic device 501 and/or the intelligent server 601. Hereinafter, a description is provided based on an assumption that the electronic device 501 performs the operations.

Figure 6:
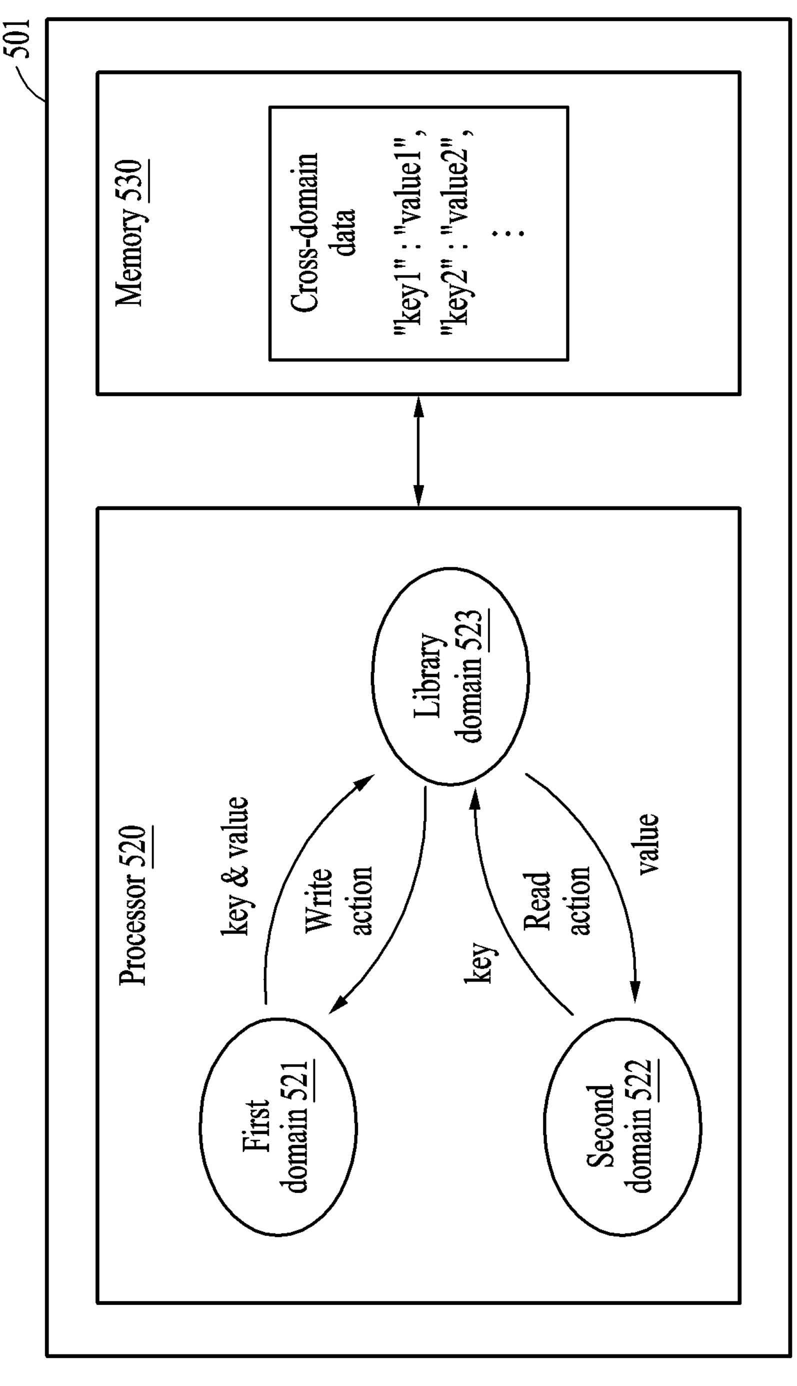
FIG. 6 is a schematic block diagram of an electronic device according to an embodiment.

FIG. 6 is a schematic block diagram of an electronic device according to an embodiment.

Referring to FIG. 6, in an embodiment, the electronic device 501 may include at least some components of the electronic device 101 described with reference to FIG. 1 and the electronic device 201 described with reference to FIG. 2. As described above, on-device AI for processing an utterance without communication with an intelligent server (e.g., the intelligent server 200 of FIG. 2 or the intelligent server 502 of FIG. 5) may be installed in the electronic device 501. The natural language platform 220 described with reference to FIGS. 2 to 4 may be implemented in the electronic device 501. With respect to the electronic device 501, repeated descriptions provided with reference to FIGS. 1 to 4 are omitted. The electronic device 501 may include a processor 520 (e.g., the processor 120 of FIG. 1 and the processor 203 of FIG. 2) and memory 530 (e.g., the memory 130 of FIG. 1 and the memory 207 of FIG. 2) electrically connected to the processor 520. The processor 520 (e.g., an application processor) may execute instructions by accessing the memory 530. The processor 520 may perform an operation for providing a response to a user. The memory 530 may store a variety of data used by at least one component (e.g., the processor 520) of the electronic device 501.

According to an embodiment, the electronic device 501 may support a cross-domain scenario. As described above with reference to FIG. 5, the cross-domain scenario may mean that a plurality of utterances (e.g., consecutive utterances) respectively correspond to different domains. The electronic device 501 may provide an appropriate response corresponding to a subsequent utterance (e.g., an utterance after a user utterance) in the cross-domain scenario as well by using cross-domain data obtained based on the user utterance and/or response provided to a user.

According to an embodiment, the processor 520 may receive a first utterance. The first utterance may correspond to a first domain 521. The processor 520 may provide a first response corresponding to the first utterance based on the first domain 521.

According to an embodiment, the processor 520 may obtain the cross-domain data based on the first utterance and/or the first response. The processor 520 may obtain the cross-domain data from the first utterance and/or the first response based on the first domain 521. The cross-domain data may be used to support the cross-domain scenario meaning that the utterances (e.g., the consecutive utterances) respectively correspond to the different domains. The cross-domain data may include the data (a value of FIG. 6) obtained based on the first utterance and/or the first response and a category (e.g., a key of FIG. 6) of the obtained data. The category of the obtained data may be predefined. The processor 520 may generate activation information of the cross-domain data based on the first domain 521. The processor 520 may transmit the cross-domain data and the activation information of the cross-domain data to a library domain 523.

According to an embodiment, the processor 520 may store the cross-domain data and the activation information of the cross-domain data based on the library domain 523. For example, the activation information may include session information including information on a period, during which a voice recognition service (e.g., a voice recognition service activated based on the first utterance) lasts, to process the subsequent utterance (e.g., a second utterance) following the first utterance. For example, the activation information may include timeout information corresponding to the category of the cross-domain data.

According to an embodiment, the processor 520 may receive the second utterance following the first utterance. The second utterance may correspond to a second domain 522. The second domain 522 may be different from the first domain 521. For example, the first domain may be the Gracenote domain corresponding to a music search service (e.g., the Gracenote service). For example, the second domain may be the Melon domain corresponding to a music play service (e.g., the Melon service). The second utterance may be an utterance including anaphora. The processor 520 may transmit a category (e.g., the key of FIG. 6) corresponding to the anaphora (e.g., the anaphora included in the second utterance) to the library domain 523.

According to an embodiment, the processor 520 may compare the category corresponding to the anaphora (e.g., the anaphora included in the second utterance) with the category of the cross-domain data (e.g., the cross-domain data obtained based on the first utterance), based on the library domain 523. The processor 520 may read the cross-domain data when the anaphora (e.g., the anaphora included in the second utterance) matches with the category of the cross-domain data (e.g., the cross-domain data obtained based on the first utterance), and the cross-domain data is activated, based on the library domain 523.

According to an embodiment, the processor 520 may provide a second response corresponding to the second utterance (e.g., the second utterance including the anaphora) based on the cross-domain data (e.g., the cross-domain data obtained based on the first utterance). As described above, the first domain 521 and the second domain 522 respectively corresponding to the first utterance and the second utterance may be different from each other, and the electronic device 501 may support the cross-domain scenario. The example of the cross-domain scenario is provided in Table 1.

TABLE 1

| No. | Utterances | Cross-domain | Cross-domain data | Key | Value |
|---|---|---|---|---|---|
| 1 | What time is it now in San Francisco? > How's the weather here? | Date & Time > Weather | Place-San Francisco | Place | San Francisco (Locality Name Value) |
| 2 | When is my mom's birthday? > Remind me to call my mom on that day. | Calendar > Reminder | Date-Jan. 1, 1965 | Date | 1656028800000 (millisecond value) |
| 3 | What is this song? > Play this song. | Gracenote > Melon | Artist, Song-IU, Through the Night | Music | {artists: [IU], song: [Through the Night]} |
| 4 | What is this song? > Add this song to my playlist. | Gracenote > Melon | Artist, Song-LEE Moon-Sae, Old Love | Music | {artists: [LEE, Moon-Sae], song: [Old Love]} |
| 5 | Tell me tomorrow's meeting schedule. > Set the alarm 30 minutes before the time. | Calendar > Alarm & Timer | Time-15:00 | Time | 12474400025442 (millisecond value) |
| 6 | Multiply 72,000 won by 32. > Save it to the Notes | Calculator > Samsung Notes | Common-2304000 | Common | 2304000 |
| 7 | Translate "Let's meet up at 5 tonight." in English. > Send this to Michael. | Translator > Messages | Common-Let's meet up at 5 tonight. | Common | Let's meet up at 5 tonight. |

Referring to Table 1, for example, the electronic device 501 may receive an utterance (e.g., "What time is it now in San Francisco?"). The electronic device 501 may receive a subsequent utterance (e.g., "How's the weather here?") following the utterance (e.g., "What time is it now in San Francisco?"). The utterance (e.g., "What time is it now in San Francisco?") may correspond to a date & time domain associated with a service providing a date and time. The subsequent utterance (e.g., "How's the weather here?") may correspond to a weather domain associated with a service providing the weather. Since the continuous utterances respectively correspond to the different domains, the foregoing example may be the cross-domain scenario. The subsequent utterance (e.g., "How's the weather here?") may include anaphora (e.g., here). In the cross-domain scenario, the electronic device 501 may use the information (e.g., the cross-domain data) (e.g., San Francisco) included in the utterance (e.g., "What time is it now in San Francisco?") to process the subsequent utterance (e.g., "How's the weather here?") including the anaphora (e.g., here) (or insufficiently including the information needed for utterance processing). The electronic device 501 may provide a response (e.g., "San Francisco is sunny.") corresponding to the subsequent utterance (e.g., "How's the weather here?") based on the cross-domain data (e.g., place—San Francisco). The electronic device 501 may support the cross-domain scenario based on the cross-domain data obtained from the user utterance.

According to an embodiment, the processor 520 may overwrite the cross-domain data with subsequent cross-domain data when obtaining the subsequent cross-domain data, of which a category is the same as the category of the cross-domain data. The example of an overwriting operation is provided in Table 2.

TABLE 2

| No. | Utterances | Cross-domain data | Action |
|---|---|---|---|
| 1 | What time is it now in San Francisco? | Place-San Francisco | Write |
| 2 | What about New York? | ~~Place-San Francisco~~ Place-New York | Overwrite |
| 3 | How's the weather here now? | Place-New York | Read |

Referring to Table 2, the processor 520 may obtain and store the cross-domain data (e.g., place—San Francisco) based on the user utterance (e.g., "What time is it now in San Francisco?"). The processor 520 may obtain the subsequent cross-domain data (e.g., place—New York) based on a first subsequent utterance (e.g., "What about New York?") following the user utterance (e.g., "What time is it now in San Francisco?"). The processor 520 may overwrite the cross-domain data (e.g., place—San Francisco) with the subsequent cross-domain data (e.g., place—New York) since the subsequent cross-domain data (e.g., place—New York), of which a category is the same as the category (e.g., place) of the cross-domain data (e.g., place—San Francisco), is obtained. The processor 520 may provide a response (e.g., "It is raining in New York.") corresponding to a second subsequent utterance (e.g., "How's the weather here now?") following the first subsequent utterance (e.g., "What about New York?"), based on the subsequent cross-domain data (e.g., place—New York).

Figure 7:
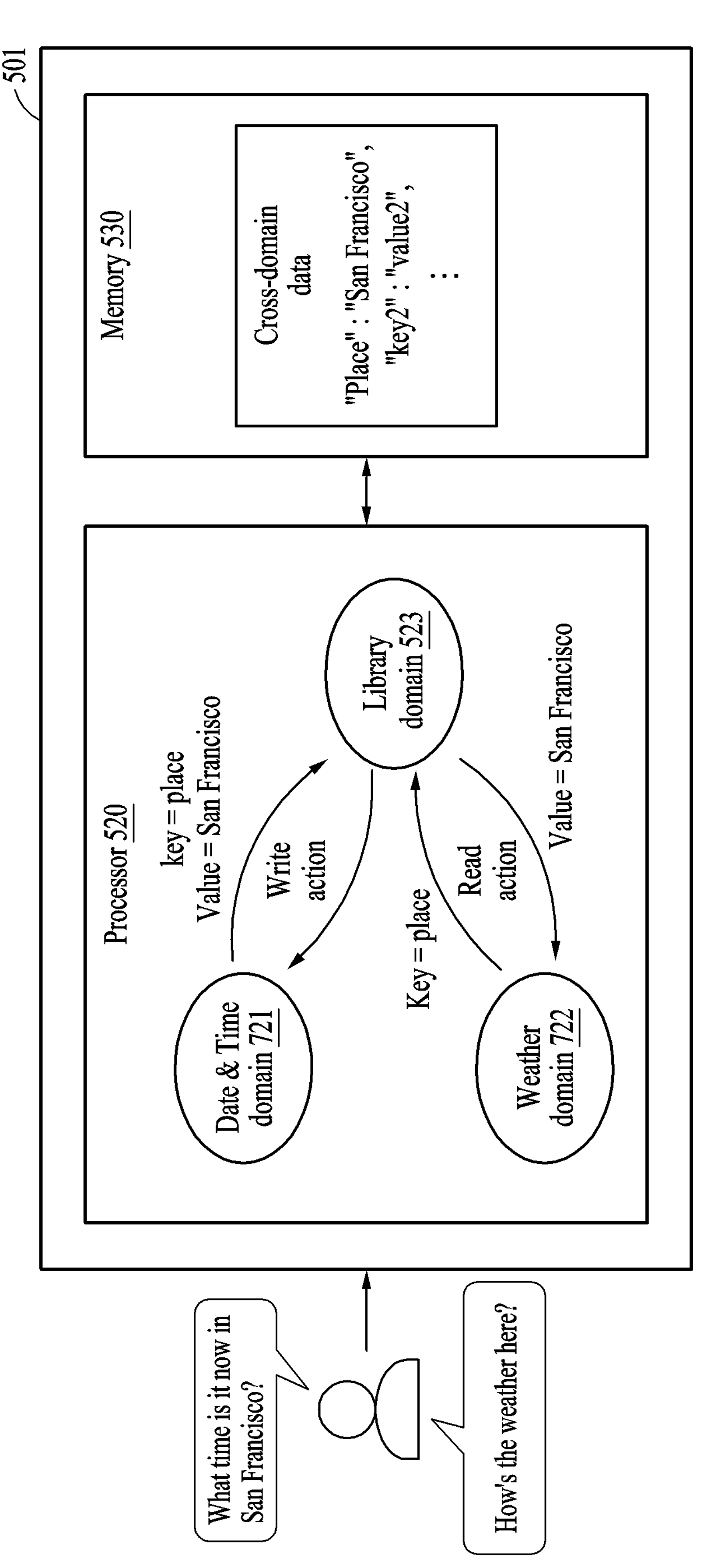
FIG. 7 is a diagram illustrating an operation of an electronic device to process a user utterance, according to an embodiment.

FIG. 7 is a diagram illustrating an operation of an electronic device to process a user utterance, according to an embodiment.

Referring to FIG. 7, the electronic device 501 may support a cross-domain scenario. As described above with reference to FIG. 5, the cross-domain scenario may mean that a plurality of utterances (e.g., consecutive utterances) respectively correspond to different domains. The electronic device 501 may provide an appropriate response corresponding to a subsequent utterance (e.g., an utterance after the user utterance) in the cross-domain scenario by using cross-domain data obtained from the user utterance.

According to an embodiment, the processor 520 may receive a first utterance (e.g., "What time is it now in San Francisco?"). The first utterance may correspond to a date & time domain 721. The processor 520 may provide a first response corresponding to the first utterance based on the date & time domain 721.

According to an embodiment, the processor 520 may obtain the cross-domain data (e.g., place—San Francisco) based on the first utterance (e.g., "What time is it now in San Francisco?"). The processor 520 may obtain the cross-domain data (e.g., place—San Francisco) from the first utterance (e.g., "What time is it now in San Francisco?") based on the date & time domain 721. The cross-domain data may be used to support the cross-domain scenario (e.g., the situation illustrated in FIG. 7) meaning that the utterances (e.g., consecutive utterances) respectively correspond to different domains (e.g., the date & time domain 721 and a weather domain 722). The cross-domain data (e.g., place—San Francisco) may include data (e.g., value=San Francisco of FIG. 7) obtained based on the first utterance and a category (e.g., key=place of FIG. 7) of the obtained data. The processor 520 may generate activation information (not shown) of the cross-domain data based on the date & time domain 721. The activation data (not shown) may be session information including information on a period during which a voice recognition service (e.g., a voice recognition service activated based on the first utterance) lasts to process the subsequent utterance (e.g., a second utterance) following the first utterance. The processor 520 may transmit the cross-domain data (e.g., place—San Francisco) and the activation data (not shown) of the cross-domain data to the library domain 523.

According to an embodiment, the processor 520 may store the cross-domain data (e.g., place—San Francisco) and the activation information (not shown) of the cross-domain data in the memory 530, based on the library domain 523. Because FIG. 7 assumes an on-device operation, the cross-domain data and the activation information of the cross-domain data are stored in the electronic device 501, but examples are not limited thereto. The cross-domain data and the activation information of the cross-domain data may be stored in an intelligent server (e.g., the intelligent server 200 of FIG. 2 and the intelligent server 601 of FIG. 6).

According to an embodiment, the processor 520 may receive the second utterance (e.g., "How's the weather here?") following the first utterance (e.g., "What time is it now in San Francisco?"). The second utterance (e.g., "How's the weather here?") may correspond to the weather domain 722. The weather domain 722 may be different from the date & time domain 721. For example, the date & time domain 721 may correspond to a date and time provision service. The weather domain 722 may correspond to a weather provision service. The situation illustrated in FIG. 7 may correspond to the cross-domain scenario. In addition, the second utterance (e.g., "How's the weather here?") may be an utterance including anaphora (e.g., here). The processor 520 may transmit a category (e.g., key=place of FIG. 7) corresponding to the anaphora (e.g., here) to the library domain 523.

According to an embodiment, the processor 520 may compare the category (e.g., place) corresponding to the anaphora (e.g., here) with the category (e.g., place) of the cross-domain data (e.g., place—San Francisco), based on the library domain 523. The processor 520 may read the cross-domain data (e.g., place—San Francisco), based on the library domain 523, when the anaphora (e.g., here) matches with the category (e.g., place) of the cross-domain data, and the cross-domain data is activated. Although not illustrated in FIG. 7, the voice recognition service activated based on the first utterance (e.g., "What time is it now in San Francisco?") may last until the second utterance (e.g., "How's the weather here?") is received. The cross-domain data (e.g., place—San Francisco) obtained based on the first utterance (e.g., "What time is it now in San Francisco?") may be activated.

According to an embodiment, the processor 520 may provide a second response corresponding to the second utterance (e.g., "How's the weather here?") including the anaphora (e.g., here), based on the cross-domain data (e.g., place—San Francisco). As described above, the date & time domain 721 and the weather domain 722 respectively corresponding to the first utterance and the second utterance may be different from each other, and the electronic device 501 may support the cross-domain scenario.

Figure 8:
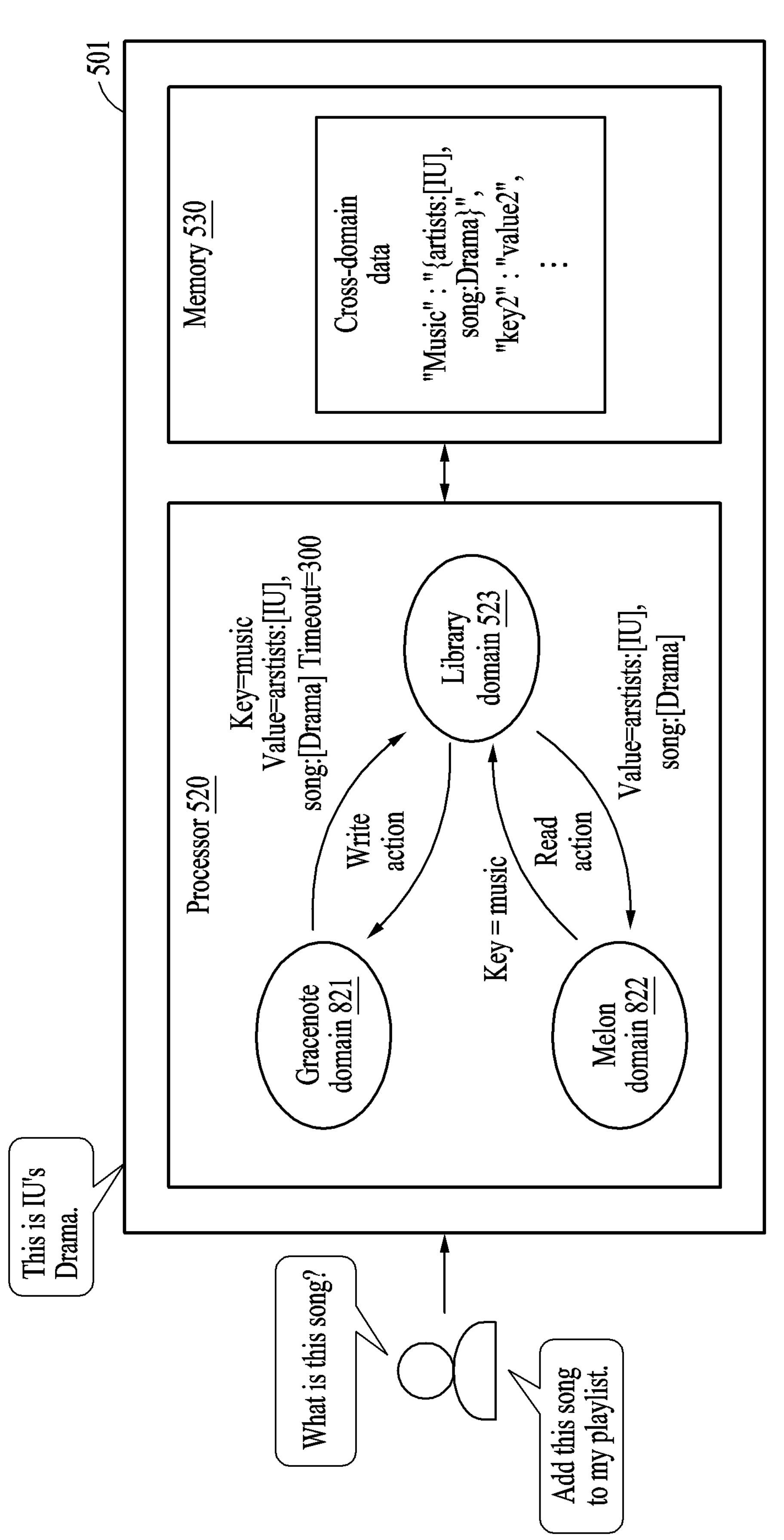
FIG. 8 is a diagram illustrating an operation of an electronic device to process a user utterance, according to an embodiment.

FIG. 8 is a diagram illustrating an operation of an electronic device to process a user utterance, according to an embodiment.

Referring to FIG. 8, the electronic device 501 may support a cross-domain scenario. As described above with reference to FIG. 5, the cross-domain scenario may mean that a plurality of utterances (e.g., consecutive utterances) respectively correspond to different domains. The electronic device 501 may provide an appropriate response corresponding to a subsequent utterance (e.g., an utterance after the user utterance) in the cross-domain scenario as well by using cross-domain data obtained based on a response provided to a user.

According to an embodiment, the processor 520 may receive a first utterance (e.g., "What is this song?"). The first utterance (e.g., "What is this song?") may correspond to a Gracenote domain 821. The Gracenote domain 821 may correspond to a music search service. The processor 520 may provide a first response (e.g., "This is IU's Drama.") corresponding to the first utterance (e.g., "What is this song?"), based on the Gracenote domain 821.

According to an embodiment, the processor 520 may obtain cross-domain data (e.g., music—artists: [IU], song: [Drama]) based on the first response (e.g., "This is IU's Drama."). The processor 520 may obtain the cross-domain data (e.g., music—artists: [IU], song [Drama]) from the first response (e.g., "This is IU's Drama.") based on the Gracenote domain 821. The cross-domain data may be used to support the cross-domain scenario (e.g., the situation illustrated in FIG. 8) meaning that the utterances (e.g., consecutive utterances) respectively correspond to different domains (e.g., the Gracenote domain 821 and a Melon domain 822). The cross-domain data (e.g., music—artists: [IU], song: [Drama]) may include data (e.g., value=artists: [IU], song: [Drama] of FIG. 8) obtained based on the first response (e.g., "This is IU's Drama.") and a category (e.g., key=music of FIG. 8) of the obtained data. The processor 520 may generate activation information (e.g., 300 ms) of the cross-domain data based on the Gracenote domain 821. The activation information (e.g., 300 ms) may be timeout information corresponding to a category (e.g., music) of the cross-domain data. The timeout information may be preset, but examples are not limited thereto. The processor 520 may transmit the cross-domain data (e.g., music—artists: [IU], song: [Drama]) and the activation information (e.g., 300 ms) of the cross-domain data to the library domain 523.

According to an embodiment, the processor 520 may store the cross-domain data (e.g., music—artists: [IU], song: [Drama]) and the activation information (e.g., 300 ms) of the cross-domain data, based on the library domain 523. Because FIG. 8 assumes an on-device operation, the cross-domain data and the activation information of the cross-domain data are stored in the electronic device 501, but examples are not limited thereto. The cross-domain data and the activation information of the cross-domain data may be stored in an intelligent server (e.g., the intelligent server 200 of FIG. 2 and the intelligent server 601 of FIG. 6).

According to an embodiment, the processor 520 may receive a second utterance (e.g., "Add this song to my playlist.") following the first utterance (e.g., "This is IU's Drama."). The second utterance (e.g., "Add this song to my playlist.") may correspond to the Melon domain 822. The Melon domain 822 may be different from the Gracenote domain 821. For example, the Gracenote domain 821 may correspond to a music search service. For example, the Melon domain 822 may correspond to a music play service. The situation illustrated in FIG. 8 may correspond to the cross-domain scenario. In addition, the second utterance (e.g., "Add this song to my playlist.") may be an utterance insufficiently including information (e.g., information on a song to be stored in the playlist) needed for utterance processing. The second utterance (e.g., "Add this song to my playlist.") may be an utterance not including slot information (e.g., the information corresponding to the song to be stored) to perform an operation (e.g., storing the song in the playlist) corresponding to the second utterance. The processor 520 may transmit a category (e.g., key=music of FIG. 8) corresponding to the slot information (e.g., the information on the song) to the library domain 523.

According to an embodiment, the processor 520 may compare the category (e.g., music) corresponding to the slot information (e.g., the information on the song) with the category (e.g., music) of the cross-domain data (e.g., music—artists: [IU], song: [Drama]), based on the library domain 523. The processor 520 may read the cross-domain data (e.g., music—artists: [IU], song: [Drama]), based on the library domain 523, when the slot information (e.g., the information on the song) matches with the category (e.g., music) of the cross-domain data, and the cross-domain data is activated. Although not illustrated in FIG. 8, 300 ms may not be exceeded after the cross-domain data (e.g., music—artists: [IU], song: [Drama]) obtained based on the first response (e.g., "This is IU's Drama.") is stored. The cross-domain data (e.g., music—artists: [IU], song: [Drama]) may be activated.

According to an embodiment, the processor 520 may provide a second response corresponding to the second utterance (e.g., "Add this song to my playlist.") insufficiently including the information (e.g., the information on the song) needed for utterance processing, based on the cross-domain data (e.g., music—artists: [IU], song: [Drama]). As described above, the Gracenote domain 821 and the Melon domain 822 respectively corresponding to the first utterance and the second utterance may be different from each other, and the electronic device 501 may support the cross-domain scenario.

Figure 9:
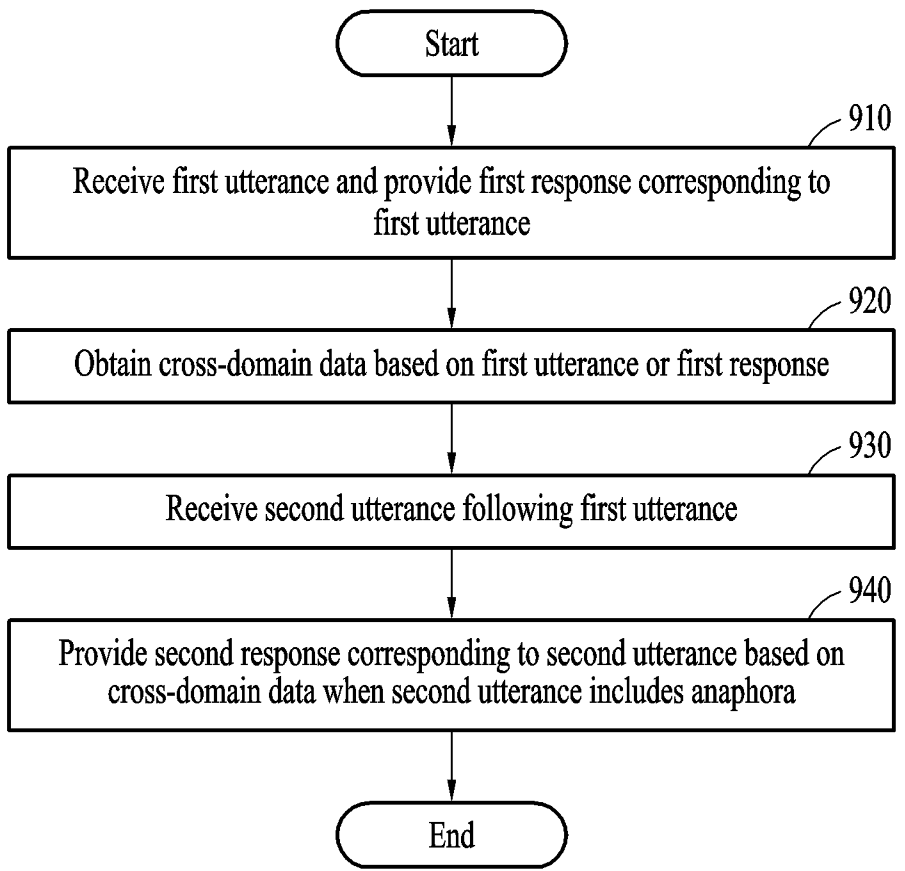
FIG. 9 is a flowchart illustrating an operating method of an electronic device, according to an embodiment.

FIG. 9 is a flowchart illustrating an operating method of an electronic device, according to an embodiment.

Operations 910 to 940 may be performed sequentially but may not necessarily be performed sequentially. For example, the order of operations 910 to 940 may be changed, and at least two of operations 910 to 940 may be performed in parallel.

According to an embodiment, it may be understood that operations 910 to 940 may be performed by a processor (e.g., the processor 520 of FIGS. 6 to 8 of an electronic device (e.g., the electronic device 501 of FIG. 5).

In operation 910, the electronic device (e.g., the electronic device 501 of FIG. 5) may receive a first utterance and provide a first response corresponding to the first utterance.

In operation 920, the electronic device 501 may obtain cross-domain data based on the first utterance or the first response. The cross-domain data may be used to support a cross-domain scenario meaning that a plurality of utterances respectively correspond to different domains. The cross-domain data may include data obtained based on the first utterance or the first response and a category of the obtained data.

In operation 930, the electronic device 501 may receive a second utterance following the first utterance.

In operation 940, the electronic device 501 may provide a second response corresponding to the second utterance based on the cross-domain data when the second utterance includes anaphora (or the second utterance insufficiently includes information needed for utterance processing).

According to an embodiment, the electronic device (e.g., the electronic device 101 of FIG. 1, the electronic device 201 of FIG. 2, and the electronic device 501 of FIG. 5) may include: memory (e.g., the memory 130 of FIG. 1, the memory 201 of FIG. 2, and the memory 530 of FIG. 6) storing instructions; and at least one processor (e.g., the processor 120 of FIG. 1, the processor 203 of FIG. 2, and the processor 520 of FIG. 6). Wherein the instructions which when executed by at least one processor, cause at least one processors to perform control to: receive a first signal corresponding to a first utterance of a user; provide a first response corresponding to the first utterance; obtain cross-domain data based on the first utterance or the first response; receive a second signal corresponding to a second utterance following the first utterance; and provide a second response corresponding to the second utterance based on the cross-domain data when the second utterance includes anaphora. The first utterance and the second utterance respectively correspond to different domains.

According to an embodiment, the cross-domain data may be used to support a cross-domain scenario in which a plurality of utterances respectively correspond to different domains.

According to an embodiment, the cross-domain data may include (i) data obtained based on the first utterance or the first response and (ii) a category of the obtained data.

According to an embodiment, the instructions which when executed by at least one processor, cause at least one processors to perform control to: store the cross-domain data and activation information of the cross-domain data in the memory based on a library domain.

According to an embodiment, the activation information may include session information including information on a period during which a voice recognition service activated based on the first utterance lasts to process an utterance following the first utterance.

According to an embodiment, the activation information may further include timeout information corresponding to the category of the obtained data included in the cross-domain data.

According to an embodiment, the instructions which when executed by at least one processor, cause at least one processors to perform control to: read the cross-domain data when the anaphora matches with the category of the obtained data included in the cross-domain data based on a library domain.

According to an embodiment, the instructions which when executed by at least one processor, cause at least one processors to perform control to: read the cross-domain data when the cross-domain data is activated, based on the library domain.

According to an embodiment, the instructions which when executed by at least one processor, cause at least one processors to perform control to: overwrite the cross-domain data with subsequent cross-domain data when obtaining the subsequent cross-domain data of which a category is the same as the category of the obtained data included in the cross-domain data.

According to an embodiment, the instructions which when executed by at least one processor, cause at least one processors to perform control to: provide the second response based on the cross-domain data when the second utterance insufficiently includes information needed for utterance processing.

According to an embodiment, a method of operating an electronic device (e.g., the electronic device 101 of FIG. 1, the electronic device 201 of FIG. 2, and the electronic device 501 of FIG. 5) may include: receiving a first signal corresponding to a first utterance; providing a first response corresponding to the first utterance; obtaining cross-domain data based on the first utterance or the first response; receiving a second signal corresponding to a second utterance of the user following the first utterance; and providing a second response corresponding to the second utterance based on the cross-domain data when the second utterance includes anaphora. The first utterance and the second utterance may respectively correspond to different domains. The cross-domain data may be used to support a cross-domain scenario in which a plurality of utterances respectively correspond to different domains.

According to an embodiment, the cross-domain data may include (i) data obtained based on the first utterance or the first response and (ii) a category of the obtained data.

According to an embodiment, the method may further include storing the cross-domain data and activation information of the cross-domain data in memory based on a library domain.

According to an embodiment, the activation information may include session information including information on a period during which a voice recognition service activated based on the first utterance lasts to process an utterance following the first utterance.

According to an embodiment, the activation information may further include timeout information corresponding to the category of the obtained data included in the cross-domain data.

According to an embodiment, the providing the second response may include reading the cross-domain data when the anaphora matches with the category of the obtained data included in the cross-domain data based on a library domain.

According to an embodiment, the reading the cross domain data may include reading the cross-domain data when the cross-domain data is activated, based on the library domain.

According to an embodiment, the method may further include overwriting the cross-domain data with subsequent cross-domain data when obtaining the subsequent cross-domain data of which a category is the same as the obtained data included in the category of the cross-domain data.

According to an embodiment, the providing the second response may further include being based on the cross-domain data when the second utterance insufficiently includes information needed for utterance processing.

According to an embodiment, the electronic device may be one of various types of electronic devices. The electronic device may include, for example, a portable communication device (e.g., a smartphone), a computer device, a portable multimedia device, a portable medical device, a camera, a wearable device, or a home appliance device. According to one embodiment, the electronic device is not limited to those described above.

It should be understood that various embodiments and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with various embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an ASIC.

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities, and some of the multiple entities may be separately disposed in different components. One or more of the above-described components may be omitted, or one or more other components may be added. Alternatively or additionally, a plurality of components (e.g., modules or programs) may be integrated into a single component. In such a case, according to one embodiment, the integrated component may still perform one or more functions of each of the plurality of components in the same or similar manner as they are performed by a corresponding one among the plurality of components before the integration. Operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one processor including processing circuitry; and memory storing instructions when executed by at the least one processor individually or collectively, cause the electronic device to:

receive a first signal corresponding to a first input of a user;

provide a first response corresponding to the first input, the first input and the first response corresponding to a first domain;

obtain cross-domain data which is used to support a cross-domain scenario in which a consecutive plurality of utterances respectively correspond to different domains, based on the first input or the first response;

store the cross-domain data and activation information of the cross-domain data in the memory based on a library domain, the activation information including information on a period during which a voice recognition service activated based on the first input lasts to process an input following the first input;

receive a second signal corresponding to a second input of the user following the first input, the second input corresponding to a second domain that is different from the first domain;

when the second input is received within the period and includes an anaphora that matches a category of the obtained cross-domain data based on the library domain, read the cross-domain data from the memory, the cross-domain data being obtained from the first input or the first response; and provide a second response corresponding to the second input based on the read cross-domain data when the second input includes the anaphora.

2. The electronic device of claim 1, wherein the cross-domain data includes (i) data obtained based on the first input or the first response and (ii) the category of the obtained data.

3. The electronic device of claim 2, wherein the instructions when executed by the at least one processor individually or collectively, cause the electronic device to: overwrite the cross-domain data with subsequent cross-domain data when obtaining the subsequent cross-domain data of which a category is the same as the category of the obtained data included in the cross-domain data.

4. The electronic device of claim 1, wherein the activation information further includes timeout information for the category of the obtained data included in the cross-domain data.

5. The electronic device of claim 1, wherein the instructions when executed by the at least one processor individually or collectively, cause the electronic device to: read the cross-domain data when the cross-domain data is activated, based on the library domain.

6. The electronic device of claim 1, wherein the instructions when executed by the at least one processor individually or collectively, cause the electronic device to: provide the second response based on the cross-domain data when the second input insufficiently includes information needed for processing.

7. The electronic device of claim 1, wherein each of the first input and the second input comprise a voice input, a text input, or an image input.

8. A method of operating an electronic device, the method comprising:

receiving a first signal corresponding to a first input;

providing a first response corresponding to the first input, the first input and the first response corresponding to a first domain;

obtaining cross-domain data which is used to support a cross-domain scenario in which a consecutive plurality of utterances respectively correspond to different domains, based on the first input or the first response;

storing the cross-domain data and activation information in a memory of the electronic device, based on a library domain, the activation information including information on a period during which a recognition service activated based on the first input lasts to process an input following the first input;

receiving a second signal corresponding to a second input of the user following the first input, the second input corresponding to a second domain that is different from the first domain;

when the second input is received within the period and includes an anaphora that matches a category of the obtained cross-domain data based on the library domain, reading the cross-domain data from the memory, the cross-domain data being obtained from the first input or the first response; and providing a second response corresponding to the second input based on the read cross-domain data when the second input includes the anaphora.

9. The method of claim 8, wherein the cross-domain data is used to support a cross-domain scenario in which a plurality of inputs respectively correspond to different domains.

10. The method of claim 8, wherein the cross-domain data includes (i) data obtained based on the first input or the first response and (ii) the category of the obtained data.

11. The method of claim 10, further comprising overwriting the cross-domain data with subsequent cross-domain data when obtaining the subsequent cross-domain data of which a category is the same as the obtained data included in the category of the cross-domain data.

12. The method of claim 8, wherein the activation information further includes timeout information for the category of the obtained data included in the cross-domain data.

13. The method of claim 8, wherein the reading the cross domain data comprises reading the cross-domain data when the cross-domain data is activated, based on the library domain.

14. The method of claim 8, wherein the providing the second response further comprises being based on the cross-domain data when the second input insufficiently includes information needed for processing.

15. The method of claim 8, wherein each of the first input and the second input comprise a voice input, a text input, or an image input.

* * * * *